(12) United States Patent
Wojcik et al.

(10) Patent No.: US 10,927,999 B1
(45) Date of Patent: Feb. 23, 2021

(54) SUPPORT ASSEMBLY

(71) Applicants: Caleb Lawrence Wojcik, Encinitas, CA (US); Patrick Philip Flynn, San Diego, CA (US)

(72) Inventors: Caleb Lawrence Wojcik, Encinitas, CA (US); Patrick Philip Flynn, San Diego, CA (US)

( * ) Notice: Subject to any disclaimer, the term of this patent is extended or adjusted under 35 U.S.C. 154(b) by 62 days.

(21) Appl. No.: 16/552,318

(22) Filed: Aug. 27, 2019

Related U.S. Application Data

(60) Provisional application No. 62/691,200, filed on Jun. 28, 2018.

(51) Int. Cl.
*F16M 11/16* (2006.01)
*F16M 11/22* (2006.01)
*F16M 13/04* (2006.01)
*G03B 17/56* (2021.01)

(52) U.S. Cl.
CPC ............. *F16M 11/16* (2013.01); *F16M 11/22* (2013.01); *F16M 13/04* (2013.01); *G03B 17/561* (2013.01)

(58) Field of Classification Search
CPC combination set(s) only.
See application file for complete search history.

(56) References Cited

U.S. PATENT DOCUMENTS

| | | | | |
|---|---|---|---|---|
| 2,188,237 A | * | 1/1940 | Weaver | F16M 11/2021 248/168 |
| 2,786,641 A | * | 3/1957 | Applegate | A47G 33/12 248/523 |
| 4,648,698 A | * | 3/1987 | Iwasaki | F16M 11/105 248/163.1 |
| 5,647,565 A | * | 7/1997 | Wei | F16M 11/10 248/168 |
| 6,068,224 A | * | 5/2000 | Horiuchi | F16M 11/16 248/187.1 |
| 6,234,434 B1 | * | 5/2001 | Avinger | A47G 33/12 248/188.7 |
| 6,254,044 B1 | * | 7/2001 | Lee | F16M 11/14 248/163.1 |
| 6,491,266 B1 | * | 12/2002 | Chen | F16M 11/16 248/163.1 |
| 6,695,268 B1 | * | 2/2004 | Hsieh | A47B 19/002 248/188.7 |
| 7,364,320 B2 | * | 4/2008 | Van Deursen | H01M 2/34 362/190 |
| 7,490,797 B1 | * | 2/2009 | Law | F16M 11/242 248/163.2 |
| 7,669,814 B2 | * | 3/2010 | Bogel | F16M 11/16 248/163.1 |

(Continued)

*Primary Examiner* — Monica E Millner
(74) *Attorney, Agent, or Firm* — Plager Schack LLP; Mark H. Plager; Michael J. O'Brien

(57) ABSTRACT

A support assembly is configured to be arranged as a tripod and as a handle. The support assembly has a first leg, further having a first leg upper plate, a first leg lower plate having a first leg lower plate magnet, and a first leg lower magnet. A second leg further has a second leg upper plate having a second leg upper plate magnet, a second leg lower plate, and a second leg lower magnet. A third leg further has a third leg upper plate having a third leg upper plate magnet, a third leg lower plate having a third leg lower plate magnet, and a third leg stop plate. The legs can be arranged to form either a handle or a tripod.

3 Claims, 5 Drawing Sheets

(56) References Cited

U.S. PATENT DOCUMENTS

| | | | | |
|---|---|---|---|---|
| 8,858,097 B2* | 10/2014 | Hale | ................... | G03B 17/561 |
| | | | | 396/428 |
| 10,088,096 B2* | 10/2018 | Minn | ..................... | F16M 11/38 |
| 10,260,675 B2* | 4/2019 | Miller | ................ | E04H 12/2269 |

* cited by examiner

SUPPORT ASSEMBLY

RELATED APPLICATION

This application claims priority to provisional patent application U.S. Ser. No. 62/691,200 filed on Jun. 28, 2018, the entire contents of which is herein incorporated by reference.

BACKGROUND

The embodiments herein relate generally to devices that support visual equipment.

People that filmed themselves with cameras did so in two main ways. First, they put their camera on a tripod so they could set it down in one spot to film. Second, they held their camera out at arm's length when they are walking around. There was no device that they could put their camera on that does both of these things well.

The main issue with other devices was that it takes a long time to switch between the two modes of filming or vlogging with the camera. Another issues was that they were too big and bulky, so they were hard to hold in smaller hands. They also fall over easily because the tripod legs were bendable.

Embodiments of the disclosed invention solve these problems.

SUMMARY

A support assembly is configured to be arranged as a tripod and as a handle. The support assembly has a first leg, further having a first leg upper plate, a first leg lower plate having a first leg lower plate magnet, and a first leg lower magnet. A second leg further has a second leg upper plate having a second leg upper plate magnet, a second leg lower plate, and a second leg lower magnet. A third leg further has a third leg upper plate having a third leg upper plate magnet, a third leg lower plate having a third leg lower plate magnet, and a third leg stop plate.

In a first mode of operation, the first leg is rotated against the third leg stop plate such that the first leg lower plate magnet is magnetically coupled to the third leg lower plate magnet while the second leg is rotated against the third leg stop plate such that the second leg upper plate magnet is magnetically coupled to the third leg upper plate magnet forming the tripod. In a second mode of operation, the first leg and the second leg are rotated against the third leg such that first lower leg magnet is magnetically coupled to second lower leg magnet forming the handle.

In some embodiments, the first leg upper plate further comprises a first leg upper plate central opening and a plurality of fastener openings. The first leg lower plate further comprises a first leg lower plate central opening. The second leg upper plate further comprises a second leg upper plate central opening. The third leg lower plate further comprises a third leg lower plate central opening. The third leg upper plate further comprises a third leg upper plate central opening.

In some embodiments, a knob is joined to a shoulder screw. The shoulder screw is inserted through a second leg lower plate central opening, a first washer, the third leg lower plate central opening, a second washer, the first leg lower plate central opening, a third washer, the second leg upper plate central opening, a fourth washer, the third leg upper plate central opening, a fifth washer, the first leg upper plate central opening, a retaining ring, a head plate, and a rubber ring

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
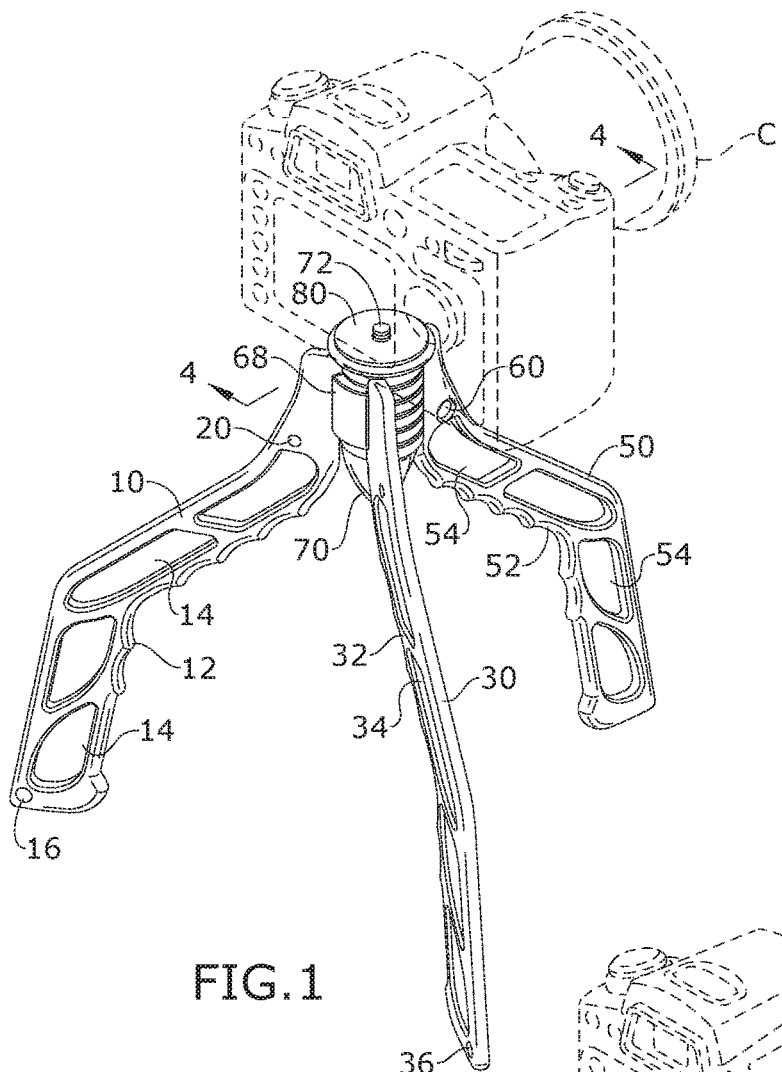
FIG. 1 shows a perspective view of one embodiment of the present invention shown in use.
Figure 2:
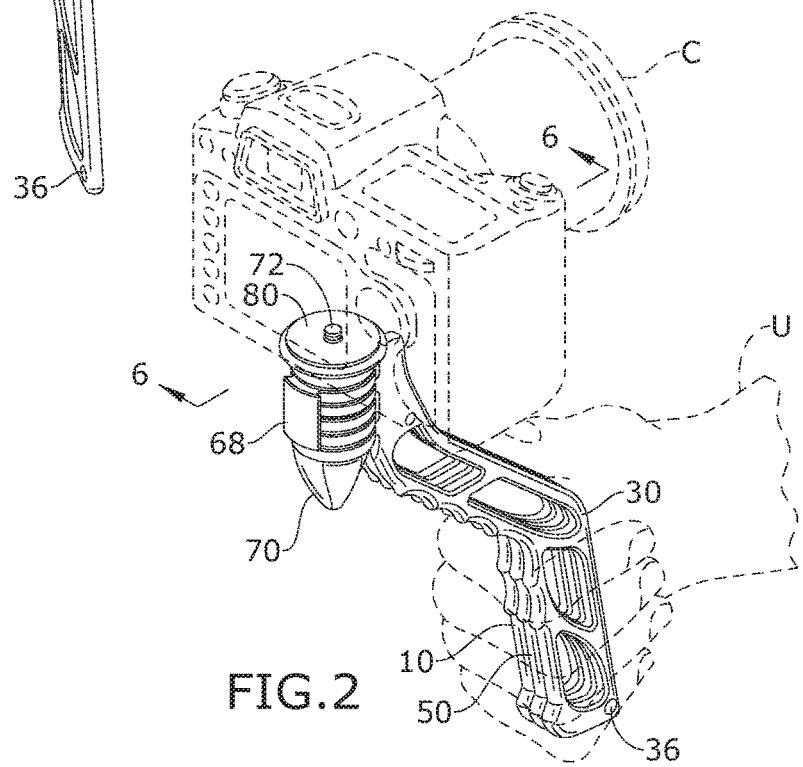
FIG. 2 shows a perspective view of one embodiment of the present invention shown in use.
Figure 3:
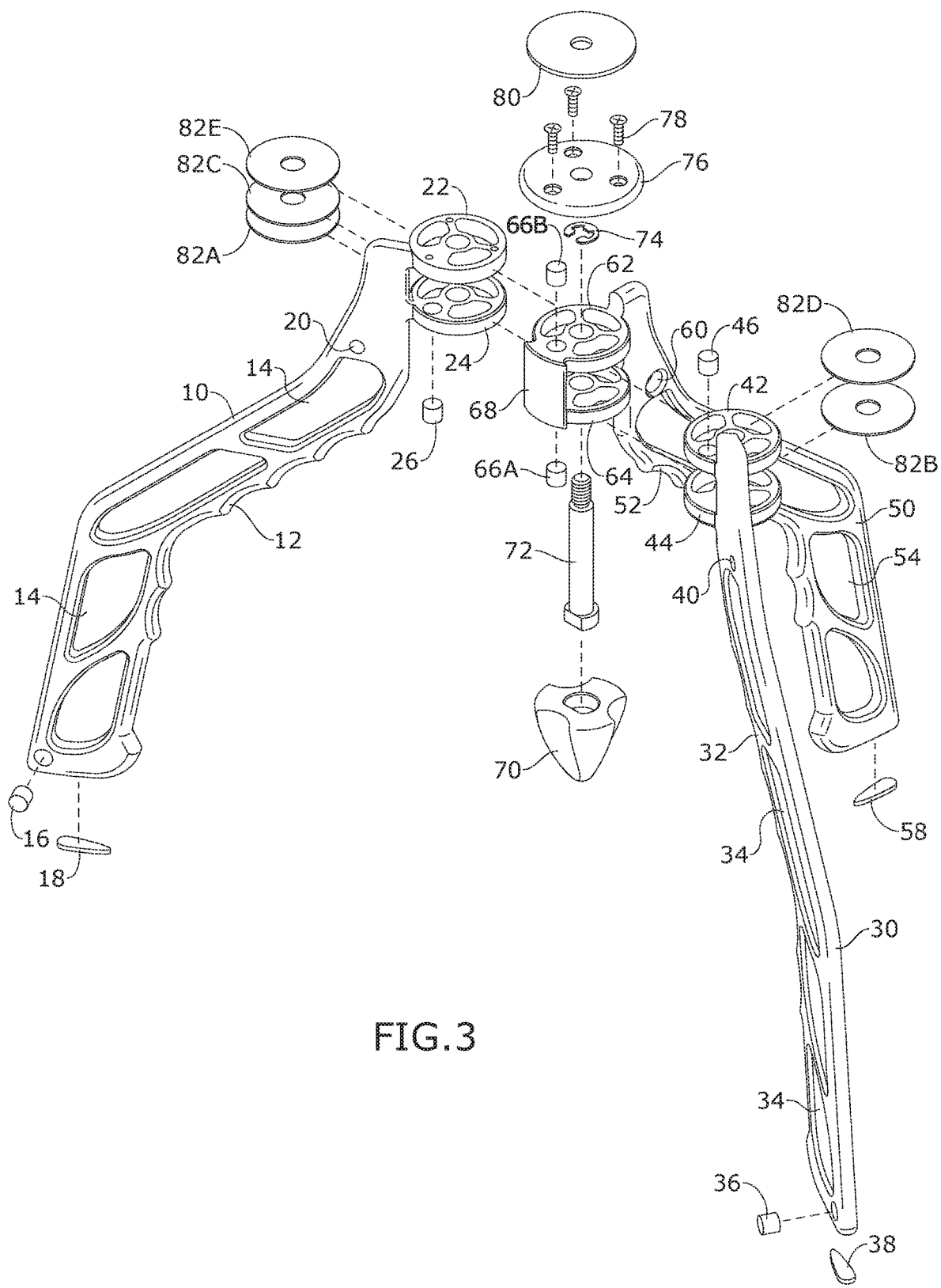
FIG. 3 shows an assembly view of one embodiment of the present invention.
Figure 4:
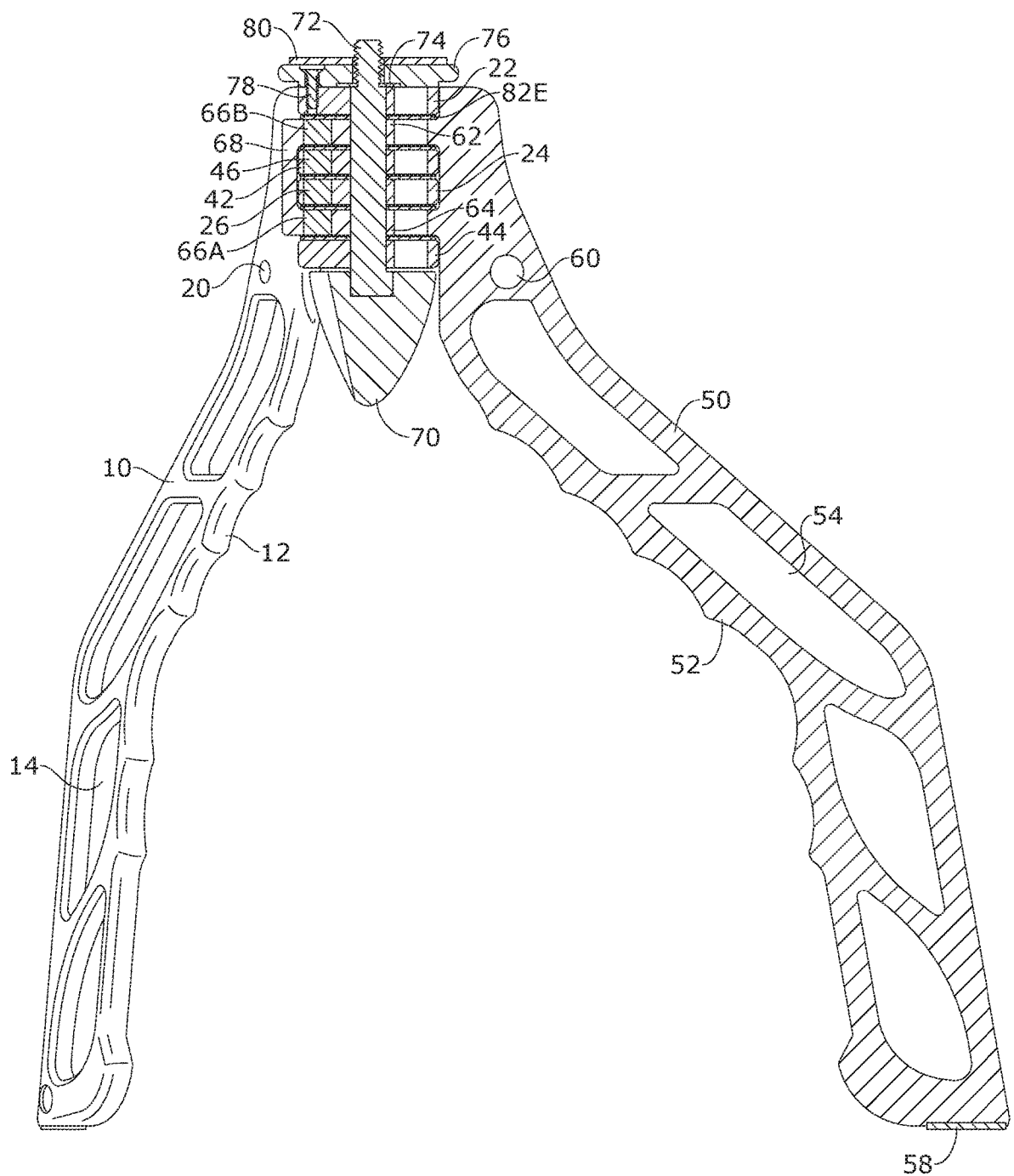
FIG. 4 shows a section view of one embodiment of the present invention taken along line 4-4 in FIG. 1.
Figure 5:
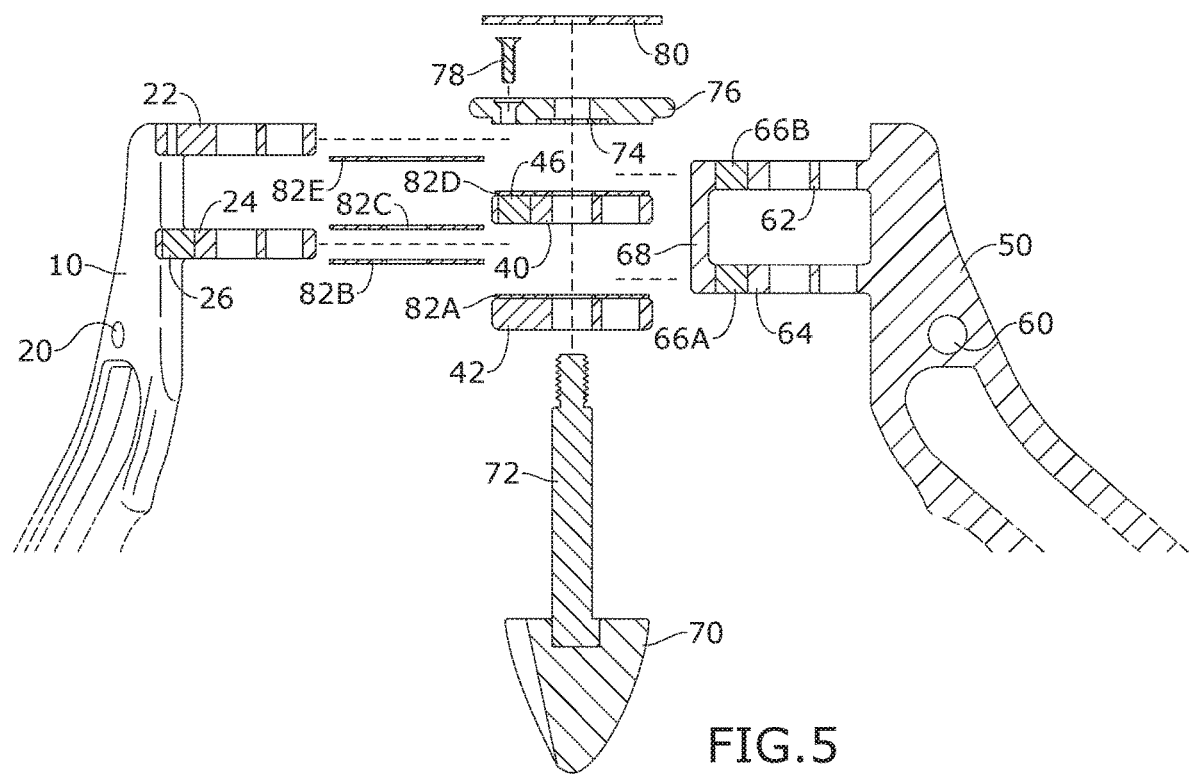
FIG. 5 shows an section assembly view of one embodiment of the present invention.
Figure 6:
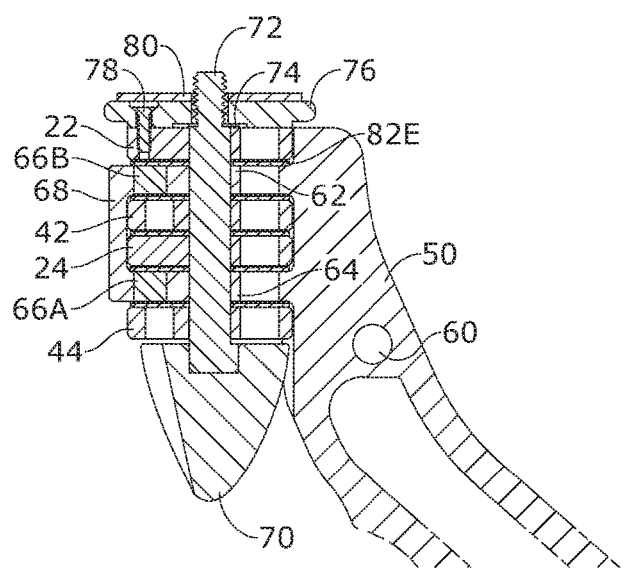
FIG. 6 shows an section assembly view of one embodiment of the present invention.
Figure 7:
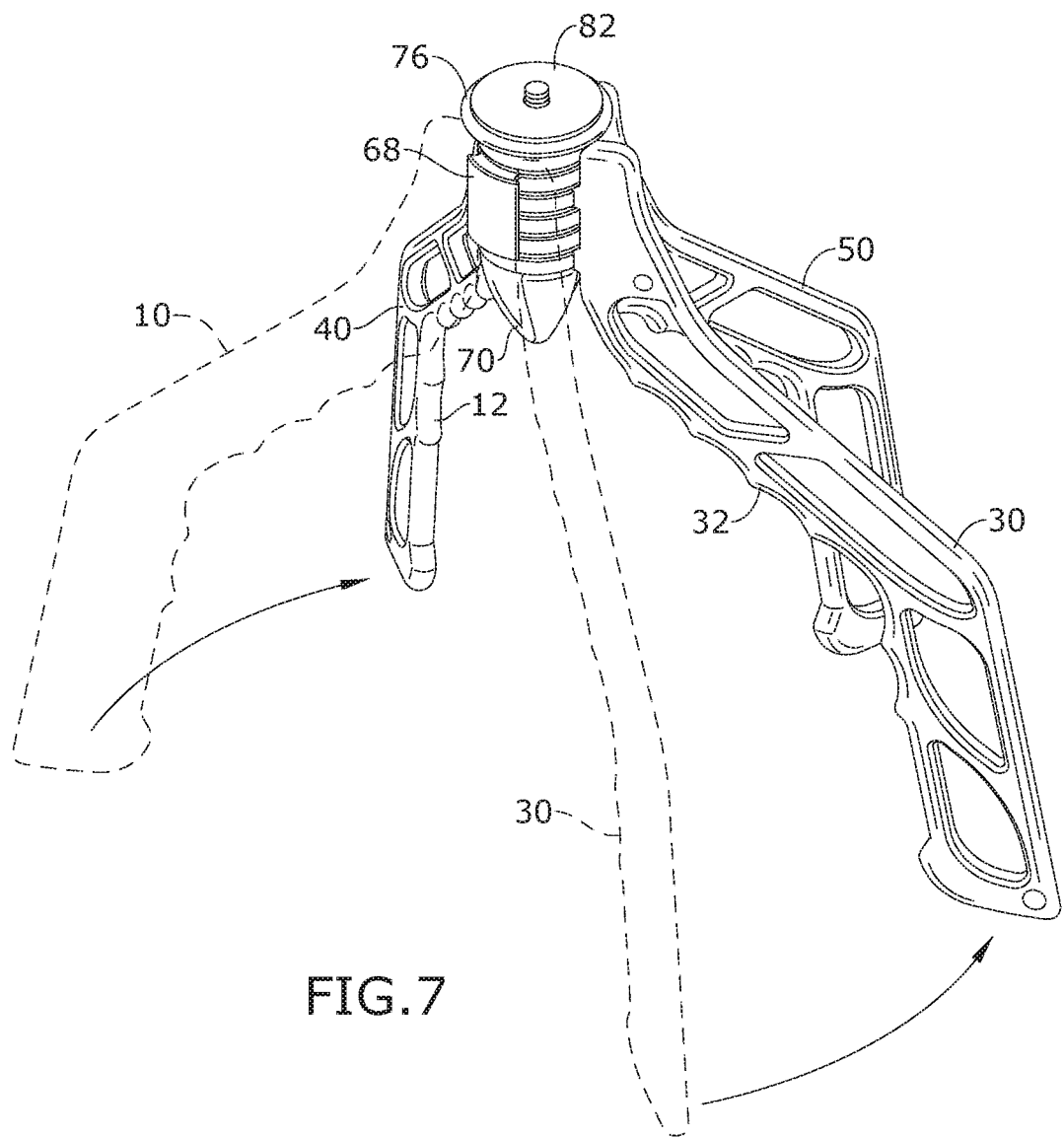
FIG. 7 shows a perspective view of one embodiment of the present invention shown in use.

By way of example, and referring to FIG. 1, one embodiment of a support assembly comprises a first leg 10 rotationally joined to a second leg 30 and a third leg 50. The first leg 10 further comprises a first leg grip 12 and a plurality of first leg clip slots 14. A first leg lower portion is joined to a first leg lower magnet 16 and a first leg foot 18. A first leg upper portion further comprises a first leg opening 20, a first leg upper plate 22, and a first leg lower plate 24. The first leg upper plate 22 further comprises a first leg upper plate central opening and a plurality of fastener openings. The first leg lower plate 24 further comprises a first leg lower plate central opening. A first leg lower plate magnet 26 is inserted into the first leg lower plate 24. In some embodiments, the first leg opening 20 is a ¼ inch 20-thread threaded opening configured to accommodate a camera accessory.

The second leg 30 further comprises a second leg grip 32 and a plurality of second leg clip slots 34. A second leg lower portion is joined to a second leg lower magnet 36 and a second leg foot 38. A second leg upper portion further comprises a second leg opening 40, a second leg upper plate 42, and a second leg lower plate 44. The second leg upper plate 42 further comprises a second leg upper plate central opening. The second leg lower plate 44 further comprises a second leg lower plate central opening. A second leg upper plate magnet 46 is inserted into the second leg upper plate 42. In some embodiments, the second leg opening 40 is a ¼ inch 20-thread threaded opening configured to accommodate a camera accessory.

The third leg 50 further comprises a third leg grip 52 and a plurality of third leg clip slots 54. A third leg lower portion is joined to a third leg lower magnet 56 and a third leg foot 58. A third leg upper portion further comprises a third leg opening 60, a third leg upper plate 62, and a third leg lower plate 64. The third leg upper plate 62 further comprises a third leg upper plate central opening. The third leg lower plate 64 further comprises a third leg lower plate central opening.

A third leg lower plate magnet 66A is inserted into the third leg lower plate 64. A third leg upper plate magnet 66B is inserted into the third leg upper plate 62. A third leg stop plate 68 joins the third leg upper plate 62 to the third leg lower plate 64.

The tripod assembly is assembly is assembled as follows. A knob 70 is joined to a shoulder screw 72. The shoulder screw is inserted through the second leg lower plate central opening, a first washer 82A, the third leg lower plate central opening, a second washer 82B, the first leg lower plate central opening, a third washer 82C, the second leg upper plate central opening, a fourth washer 82D, the third leg upper plate central opening, a fifth washer 82E, the first leg upper plate central opening, a retaining ring 74, a head plate 76, and a rubber ring 80.

A shoulder screw threaded portion 82 extends above the rubber ring 80. A camera C can be attached to the shoulder screw threaded portion 82.

In a first mode of operation, the third leg 50 is fixed and the first leg 10 and second leg 30 are rotated against respective sides of the third leg stop plate 68. In the first mode of operation the first leg lower plate magnet 26 is magnetically coupled to the third leg lower plate magnet 66A while the second leg upper plate magnet 46 is magnetically coupled to the third leg upper plate magnet 66B. The first mode of operation results in three legs in a fixed position to be used as a tripod.

In a second mode of operation, the third leg 50 is fixed and the first leg 10 and second leg 30 are rotated immediately adjacent to the third leg 50 forming a handle which accommodates a hand of a user U. In the second mode of operation, the first leg opening 20 is aligned with the second leg opening 40 and the third leg opening 60. The first leg lower magnet 16 is aligned with the second leg lower magnet 36 which holds the handle intact.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶ 6. In particular, any use of "step of" in the claims is not intended to invoke the provision of 35 U.S.C. § 112, ¶ 6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A support assembly, configured to be arranged as a tripod and as a handle; the support assembly comprising:
   a first leg, further comprising a first leg upper plate, a first leg lower plate having a first leg lower plate magnet, and a first leg lower magnet;
   a second leg, further comprising a second leg upper plate having a second leg upper plate magnet, a second leg lower plate, and a second leg lower magnet
   a third leg, further comprising a third leg upper plate having a third leg upper plate magnet, a third leg lower plate having a third leg lower plate magnet, and a third leg stop plate;
   wherein a first mode of operation, the first leg is rotated against the third leg stop plate such that the first leg lower plate magnet is magnetically coupled to the third leg lower plate magnet while the second leg is rotated against the third leg stop plate such that the second leg upper plate magnet is magnetically coupled to the third leg upper plate magnet forming the tripod;
   wherein a second mode of operation, the first leg and the second leg are rotated against the third leg such that first lower leg magnet is magnetically coupled to second lower leg magnet forming the handle.

2. The support assembly of claim 1, wherein
   the first leg upper plate further comprises a first leg upper plate central opening and a plurality of fastener openings;
   the first leg lower plate further comprises a first leg lower plate central opening;
   the second leg upper plate further comprises a second leg upper plate central opening;
   the third leg lower plate further comprises a third leg lower plate central opening; and
   the third leg upper plate further comprises a third leg upper plate central opening.

3. The support assembly of claim 2, further comprising:
   a knob, joined to a shoulder screw;
   wherein the shoulder screw is inserted through a second leg lower plate central opening, a first washer, the third leg lower plate central opening, a second washer, the first leg lower plate central opening, a third washer, the second leg upper plate central opening, a fourth washer, the third leg upper plate central opening, a fifth washer, the first leg upper plate central opening, a retaining ring, a head plate, and a rubber ring.

* * * * *